(12) United States Patent
Huang

(10) Patent No.: US 9,213,146 B2
(45) Date of Patent: Dec. 15, 2015

(54) OPTICAL SIGNAL COUPLING ASSEMBLY

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/515,038

(22) Filed: Oct. 15, 2014

(65) Prior Publication Data
US 2015/0110443 A1 Apr. 23, 2015

(30) Foreign Application Priority Data
Oct. 22, 2013 (TW) .............................. 102138094 A

(51) Int. Cl.
*G02B 6/38* (2006.01)
*G02B 6/36* (2006.01)

(52) U.S. Cl.
CPC ............ *G02B 6/3831* (2013.01); *G02B 6/3885* (2013.01); *G02B 6/3652* (2013.01); *G02B 6/3853* (2013.01); *G02B 6/3865* (2013.01); *G02B 6/3893* (2013.01)

(58) Field of Classification Search
CPC .. G02B 6/3809; G02B 6/3807; G02B 6/3842; G02B 6/3858; G02B 6/387; G02B 6/3893; G02B 6/3895; G02B 6/3564; G02B 6/36; G02B 6/4204; G02B 6/38; G02B 6/3806; G02B 6/389893

USPC ........................ 385/55, 62, 59, 65, 77, 81, 83
See application file for complete search history.

(56) References Cited

U.S. PATENT DOCUMENTS

| 6,592,268 | B2 * | 7/2003 | Chen et al. | 385/88 |
| 6,604,861 | B2 * | 8/2003 | Chen et al. | 385/56 |
| 8,430,573 | B2 * | 4/2013 | Watanabe | 385/55 |
| 8,998,505 | B2 * | 4/2015 | Motofuji | 385/78 |
| 2008/0260333 | A1 * | 10/2008 | Roth | 385/72 |
| 2012/0170892 | A1 * | 7/2012 | Lin | 385/59 |

FOREIGN PATENT DOCUMENTS

WO WO 2012088723 A1 * 7/2012

\* cited by examiner

*Primary Examiner* — Ellen Kim
(74) *Attorney, Agent, or Firm* — Novak Druce Connolly Bove + Quigg LLP

(57) ABSTRACT

An optical signal coupling assembly includes a first connector and a second connector. The first connector includes a first main body and a number of first optical coupling lenses. The second connector includes a second main body and a plurality of second optical coupling lenses to be optically coupled with the first optical coupling lenses. The first main body further includes two first connecting members, and the second main body further includes two second connecting members. The second connecting member matches with the first connecting member, the first connecting member and the second connecting member are configured for both fixing and aligning the first connector with the second connector.

8 Claims, 4 Drawing Sheets

US 9,213,146 B2

OPTICAL SIGNAL COUPLING ASSEMBLY

FIELD

The subject matter herein generally relates to fiber optic communications.

BACKGROUND

In the field of fiber optic communications, an optical signal coupling assembly often includes a first connector and a second connector coupling to the first connector to realize transmission of optical signals. Transmission quality of the optical signals is determined by the alignment between the first connector and the second connector.

BRIEF DESCRIPTION OF THE DRAWINGS

Implementations of the present technology will now be described, by way of example only, with reference to the attached figures.

DETAILED DESCRIPTION

Figure 1:
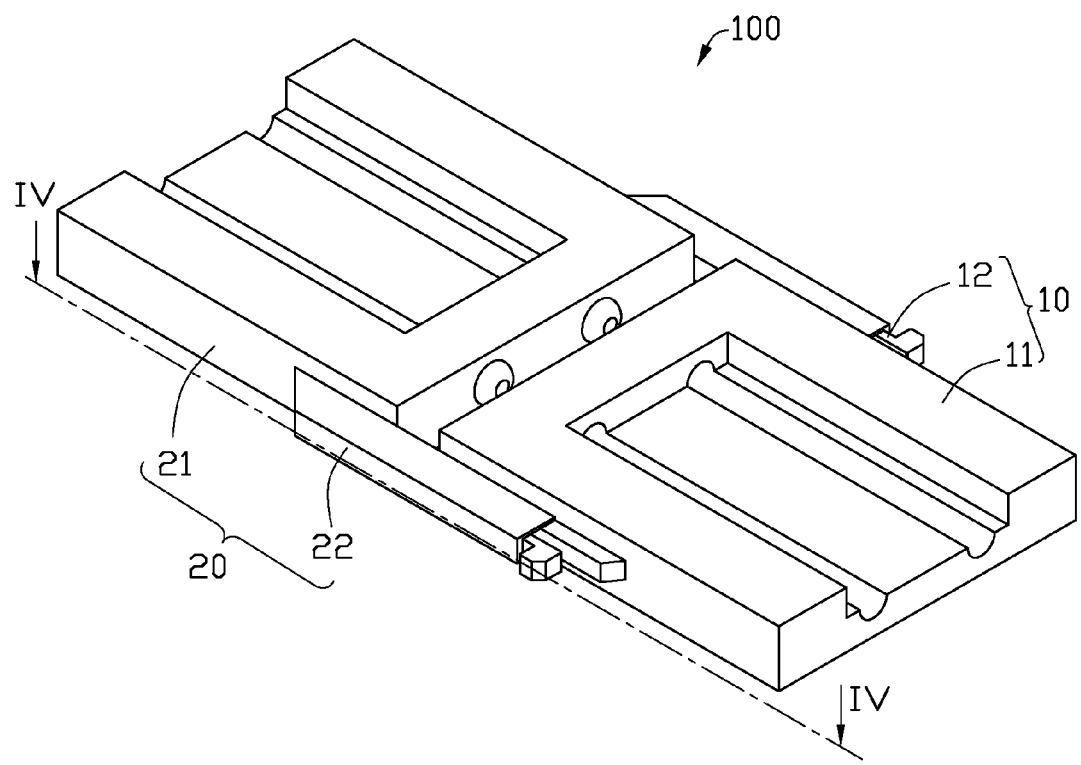
FIG. 1 is an isometric view of an optical signal coupling assembly, in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" and "a number of" mean "at least two."

FIG. 1 shows an optical signal coupling assembly 100. The optical signal coupling assembly 100 includes a first connector 10 and a second connector 20 coupling to the first connector 10.

The first connector 10 includes a first main body 11 and a first connecting member 12. The first main body 11 and the first connecting member 12 are integrally formed, the first main body 11 and the first connecting member 12 being manufactured at the same time, which simplifies the manufacturing process of the first connector 10.

Figure 2:
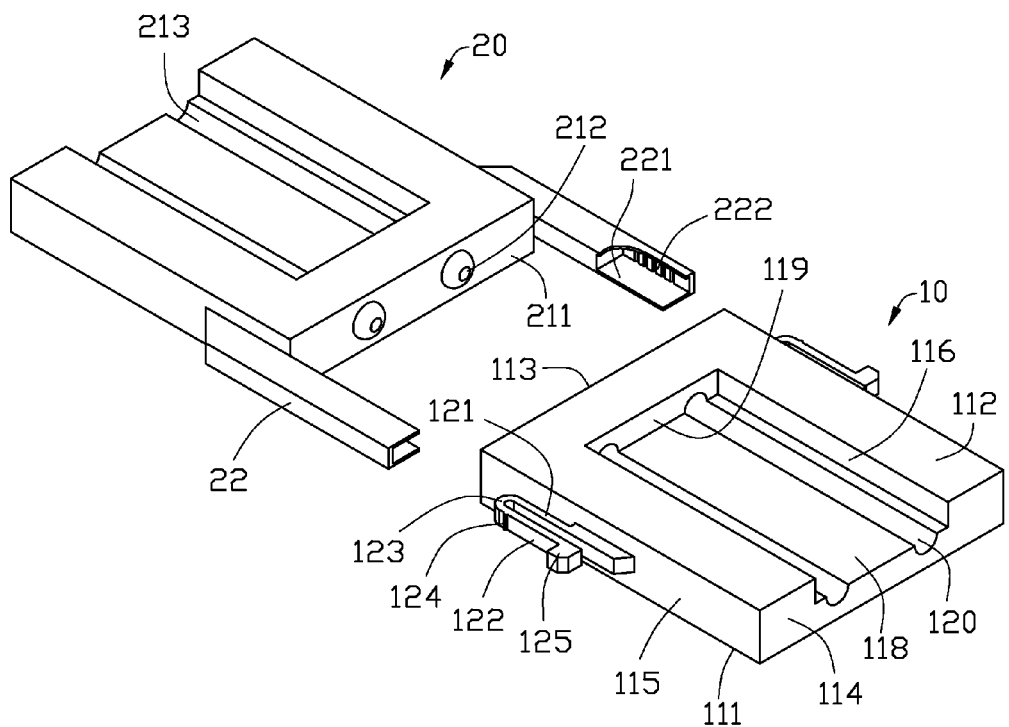
FIG. 2 is an exploded isometric view of the optical signal coupling assembly of FIG. 1.
Figure 3:
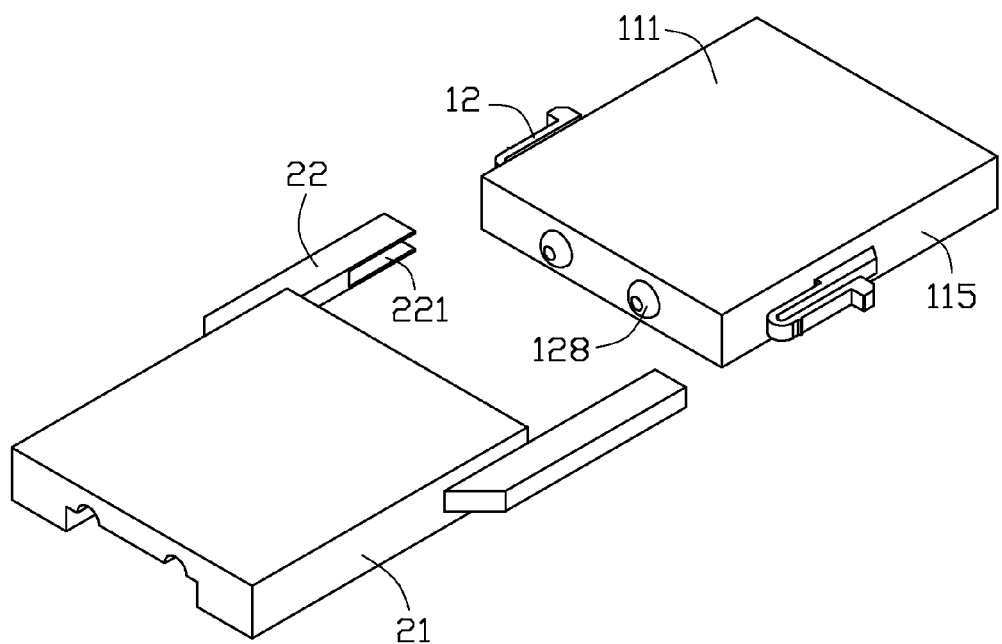
FIG. 3 is similar to FIG. 2, but viewed from another angle.

FIG. 2 illustrates the first main body 11 as being substantially a cuboid which includes a bottom surface 111, a top surface 112 opposite to the bottom surface 111, a first butting surface 113, a first backside 114 opposite to the first butting surface 113, and two first side surfaces 115 connecting the bottom surface 111 and the top surface 112. The top surface 112 defines a mounting recess 116, the mounting recess 116 is opened from the backside 114 and from the top surface 112. The mounting recess 116 includes a first inner surface 118 parallel to the bottom surface 111 and a second inner surface 119 parallel to the first butting surface 113. The first inner surface 118 defines a number of first receiving channels 120 for receiving optical fibers (not shown). In detail, the first receiving channels 120 are parallel to each other and extend in a direction perpendicularly to the first butting surface 113. In this embodiment, the quantity of the first receiving channels 120 is two but the quantity of receiving channels 120 is not limited to being two. The first connector 10 further includes a number of first optical coupling lenses 128, as shown in FIG. 3. The first optical coupling lenses 128 are arranged on the first butting surface 113 and correspond to the first receiving channels 120.

Figure 4:
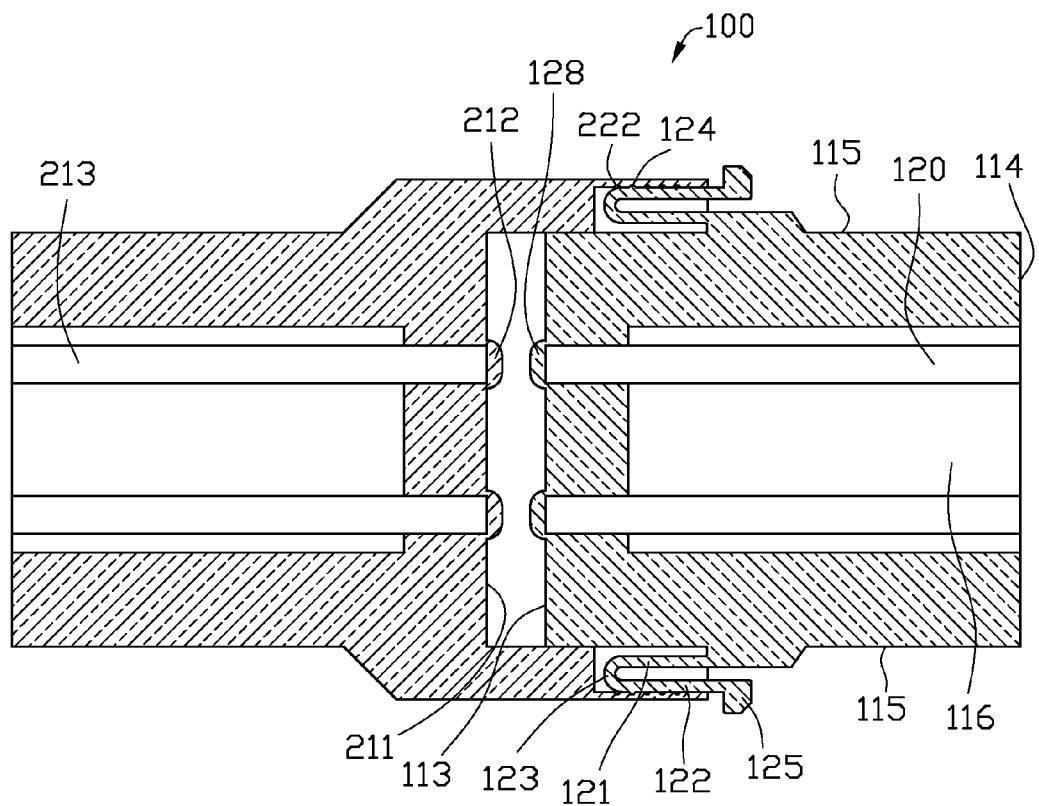
FIG. 4 is a cross sectional view taken along line IV-IV of the optical signal coupling assembly of FIG. 1.

As shown in FIG. 2 and FIG. 4, the first connecting member 12 is substantially U-shaped and is arranged on the first side surface 115. The first connecting member 12 includes a first section 121, a second section 122, a connecting section 123 connecting the first section 121 and the second section 122, and an operation end 125 at a free end of the second section 122. One end of the first section 121 is connected with the first side surface 115, the first section 121 is extended in a direction close to the first butting surface 113, and a gap is formed between the first side surface 115 and the first section 121. The second section 122 is substantially parallel to the first section 121. The first connecting member 12 has flexibility. When the operation end 125 is pressed, the second section closes towards the first section 121. The first connecting member 12 further includes a number of first position portions 124. In the illustrated embodiment, the first position portion 124 is rib protruding from the second section 122.

The second main body 21 has a same structure and shape as those of the first main body 11. The second connector 20 includes a second main body 21 and a second connecting member 22. The second main body 21 and the second connecting member 22 are integrally formed. The second main body 21 includes a second butting surface 211 facing the first butting surface 113, a number of second optical coupling lenses 212 corresponding with the first optical coupling lenses 128, and a number of second receiving grooves 213. The second main body 22 includes two second side surfaces 215 perpendicularly connected to the second butting surface 211.

The second connecting member 22 is substantially a frame made of strips. One end of the second connecting member 22 is connected with the second side surface 215 and the other end of the second connecting member 22 is a free end extending outwardly from the second butting surface 211. A distance between the two second connecting members 22 is not less than a distance between the two first surfaces. The second connecting member 22 includes a guide slot 221 configured for receiving the first connecting member 12. An inner wall of the second connecting member 22 includes a number of second position portions 222 matching the first position portions 124. The first position portions 124 and the second position portions 222 promote stability when the first connector 10 is assembled with the second connector 20. In the illustrated embodiment, the second position portion 222 is a notch.

In assembling, as shown in FIG. 3, the first connecting member 12 of the first connector 10 is plugged into the second connecting member 22 and the first connecting member moves along the guiding slot until the second position portions are received in the first position portions 222. The first butting surface 113 faces the second butting surface 211, the first optical coupling lenses 128 are aligned with the second optical coupling lenses 212. A path for optical signals between the first optical coupling lenses 128 and the second optical coupling lenses 212 is thus created. To disassemble the optical signal coupling assembly 100, the two operation ends 125 are pressed toward each other, enabling the first position portions 124 to slide out of the second position portion 222, and the first connector 10 can then be disengaged from the second connector 20.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical signal coupling assembly comprising:
   a first connector comprising a first main body and a plurality of first optical coupling lenses, the first main body is substantially a cuboid and comprises a bottom surface, a top surface opposite to the bottom surface, two first side surfaces perpendicularly connect the top surface and the bottom surface respectively and a first butting surface perpendicularly connect the two first side surfaces, the top surface defines a mounting recess, the mounting recess comprising a first inner surface parallel to the bottom surface and a second inner surface parallel to the first butting surface, the first inner surface defines a number of first receiving channels for receiving optical fibers; and
   a second connector comprising a second main body, the second main body comprising two second side surfaces opposite to each other and a second butting surface perpendicularly connected to the second side surfaces, the second butting surface arranging with a plurality of second optical coupling lenses, the second optical coupling lenses optically coupling with the first optical coupling lenses;
   wherein the first main body further comprises two first connecting members, and the second main body further comprises two second connecting members, the second connecting member is substantially a strip frame and extended outwardly from the second butting surface, the second connecting member comprises an inner side wall extending from the second butting surface, each first connecting member is arranged on each first side surface respectively, each second connecting member is arranged on each corresponding second side surface, the second connecting member matches with the first connecting member, and the first side surface contacts with the inner side wall, the first connecting member and the second connecting member are configured for fixing and aligning the first connector with the second connector.

2. The optical signal coupling assembly of claim 1, wherein the first optical coupling lenses are arranged on the first butting surface and correspond to the first receiving channels.

3. The optical signal coupling assembly of claim 1, wherein the first connecting member is substantially U-shaped.

4. The optical signal coupling assembly of claim 3, wherein the first connecting member comprises a first section, a second section, a connecting section connecting the first section and the second section and a pressing end at a free end of the second section.

5. The optical signal coupling assembly of claim 4, wherein one end of the first section is connected with the first side surface, the first section is extended in a direction close to the first butting surface and a gap is formed between the first side surface and the first section, the second section is substantially parallel to the first section.

6. The optical signal coupling assembly of claim 4, wherein one end of the second connecting member is connected with the second side surface, the other end of the second connecting member is extended outwardly from the second butting surface.

7. The optical signal coupling assembly of claim 5, wherein the other end of the second connecting member includes a guide slot configured for receiving the first connecting member.

8. The optical signal coupling assembly of claim 7, wherein the first connecting member comprises a plurality of first position portions, and an inner wall of the guide slot comprises a plurality of second position portions that match with the first position portions.

* * * * *